(12) United States Patent
Leupold et al.

(10) Patent No.: US 10,890,241 B2
(45) Date of Patent: Jan. 12, 2021

(54) QUIET GEAR WHEEL AND METHOD FOR PRODUCING SUCH A GEAR WHEEL

(71) Applicant: GKN Sinter Metals Engineering GmbH, Radevormwald (DE)

(72) Inventors: Björn Leupold, Marl (DE); Simon Höges, Overath (DE); Markus Schneider, Remscheid (DE); Thomas Schupp, Scheuerfeld (DE); Vitali Janzen, Bergisch Gladbach (DE); Gerhard A. Kotthoff, Hückeswagen (DE); Eberhard Ernst, Eichenzell (DE)

(73) Assignee: GKN Sinter Metals Engineering GmbH, Radevormwald (DE)

(*) Notice: Subject to any disclaimer, the term of this patent is extended or adjusted under 35 U.S.C. 154(b) by 379 days.

(21) Appl. No.: 15/548,255

(22) PCT Filed: Feb. 1, 2016

(86) PCT No.: PCT/EP2016/052018
§ 371 (c)(1),
(2) Date: Aug. 2, 2017

(87) PCT Pub. No.: WO2016/124514
PCT Pub. Date: Aug. 11, 2016

(65) Prior Publication Data
US 2018/0017150 A1    Jan. 18, 2018

(30) Foreign Application Priority Data
Feb. 3, 2015    (DE) .......................... 10 2015 201 873

(51) Int. Cl.
*F16H 57/00*    (2012.01)
*F16H 55/06*    (2006.01)
(Continued)

(52) U.S. Cl.
CPC ....... *F16H 57/0006* (2013.01); *B22F 3/1055* (2013.01); *B22F 3/1109* (2013.01);
(Continued)

(58) Field of Classification Search
None
See application file for complete search history.

(56) References Cited

U.S. PATENT DOCUMENTS 3,744,330 A * 7/1973 Sugimoto ............... F16H 7/023
                                            474/153
4,007,644 A * 2/1977 Weinberger ............ F16G 1/28
                                            474/148
(Continued)

FOREIGN PATENT DOCUMENTS

CN    101193716 A    6/2008
CN    201568549 U    9/2010
(Continued)

OTHER PUBLICATIONS

National Intellectual Propery Administration, P.R. China, First Office Action and Search Report, Application No. 201680008690.2, Feb. 3, 2019, 16 pages.
(Continued)

*Primary Examiner* — Kibrom K Gebresilassie
(74) *Attorney, Agent, or Firm* — Quarles & Brady LLP

(57) ABSTRACT

The present invention relates to a gear wheel containing at least one sintered material having a porosity, the gear wheel having, in addition to the porosity, another noise-reducing means.

21 Claims, 3 Drawing Sheets

Figure 1:
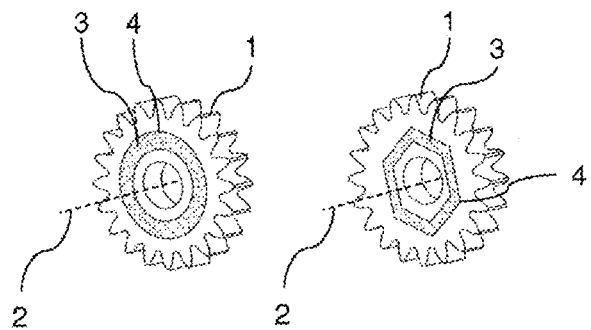

(51) Int. Cl.

| | | |
|---|---|---|
| *F16H 55/14* | (2006.01) | |
| *B33Y 10/00* | (2015.01) | |
| *B33Y 80/00* | (2015.01) | |
| *B22F 3/105* | (2006.01) | |
| *B22F 3/11* | (2006.01) | |
| B22F 5/08 | (2006.01) | |
| B22F 7/00 | (2006.01) | |
| B22F 7/08 | (2006.01) | |
| G10L 21/0208 | (2013.01) | |

(52) U.S. Cl.
CPC ............... *B33Y 10/00* (2014.12); *B33Y 80/00* (2014.12); *F16H 55/06* (2013.01); *F16H 55/14* (2013.01); *B22F 3/1112* (2013.01); *B22F 3/1118* (2013.01); *B22F 5/08* (2013.01); *B22F 7/002* (2013.01); *B22F 7/08* (2013.01); *G10L 21/0208* (2013.01)

(56) References Cited

U.S. PATENT DOCUMENTS

| | | | |
|---|---|---|---|
| 4,644,190 A | 2/1987 | Eberhard et al. | |
| 4,915,598 A * | 4/1990 | Kubis | F02B 63/06 417/380 |
| 4,929,221 A * | 5/1990 | Tanaka | F16G 1/28 474/205 |
| 5,356,721 A | 10/1994 | Knoess | |
| 5,639,230 A * | 6/1997 | Lechner | F04C 2/084 418/150 |
| 5,729,822 A * | 3/1998 | Shivanath | B22F 3/1109 148/206 |
| 6,012,350 A | 1/2000 | Mizuta et al. | |
| 6,148,685 A * | 11/2000 | Cadle | B22F 5/08 74/434 |
| 6,575,862 B2 * | 6/2003 | Miyaji | F16G 1/28 474/153 |
| 8,562,468 B2 * | 10/2013 | Tomobuchi | F16H 55/171 474/153 |
| 9,314,972 B2 | 4/2016 | Green | |
| 2008/0209730 A1 | 9/2008 | Kotthoff | |
| 2011/0126785 A1 * | 6/2011 | Terfloth | F01L 1/022 123/90.15 |
| 2014/0271314 A1 * | 9/2014 | Morselli | F04C 2/14 418/206.5 |
| 2015/0007678 A1 * | 1/2015 | Vanneste | F16H 1/10 74/421 R |
| 2016/0053881 A1 * | 2/2016 | Zeller | F16H 55/18 74/440 |

FOREIGN PATENT DOCUMENTS

| | | |
|---|---|---|
| DE | 955467 C | 1/1957 |
| DE | 7625489 U1 | 4/1977 |
| DE | 4211318 C1 | 2/1993 |
| DE | 19815860 A1 | 10/1998 |
| DE | 102005027137 A1 | 12/2006 |
| DE | 102009042598 A1 | 3/2011 |
| DE | 102013103006 A1 | 10/2013 |
| DE | 102013106686 A1 | 12/2014 |
| DE | 102014006374 A1 | 11/2015 |
| EP | 0134527 A1 | 3/1985 |
| EP | 1407877 A1 | 4/2004 |
| EP | 1552895 B1 | 12/2009 |
| EP | 2221131 A1 | 8/2010 |
| JP | S60162702 A | 8/1985 |
| JP | S6343062 A | 2/1988 |
| JP | H04327056 A | 11/1992 |
| JP | 2004036745 A | 2/2004 |
| SU | 1325232 A1 | 7/1987 |
| WO | 2013067995 A1 | 5/2013 |

OTHER PUBLICATIONS

PCT International Search Report, PCT/EP2016/052018, dated Mar. 30, 2016, 7 pages.
PCT Written Opinion, PCT/EP2016/052018, dated Mar. 30, 2016, 16 pages.
National Intellectual Property Administration, P. R. China, Third Office Action and Search Report, Application No. 201680008690.2, dated Mar. 26, 2020, 16 pages.

* cited by examiner

QUIET GEAR WHEEL AND METHOD FOR PRODUCING SUCH A GEAR WHEEL

This application represents the U.S. national stage entry of International Application No. PCT/EP2016/052018 filed Feb. 1, 2016, which claims priority to German Patent Application No. 10 2015 201 873.3 filed Feb. 3, 2015, the disclosure of which is incorporated herein by reference in its entirety and for all purposes.

The present invention concerns a gear wheel, having at least one sintered material with a porosity, wherein the gear wheel has, in addition to the porosity, another noise reducing means. Furthermore, a method for the production of such a gear wheel is proposed.

In the wake of the increasing electrification in the drive train of vehicles, the noise behavior of the gearing is of increasing significance when investigating the overall noise behavior of a vehicle. In the literature, noise reduction measures are distinguished as primary and secondary, i.e., active and passive measures. With the active measures, the mechanism of excitation is directly altered, i.e., for example, the microgeometry of the teeth. On the other hand, with the passive measures, the sound propagation is altered so that the structure-borne sound is less able to be propagated.

Possibilities of passive measures are described at length for example in a dissertation by Dietmar Mandt entitled "Eigenschaften und Einsatzverhalten von leichten und dämpfenden Werkstoffverbund-Zahnrädern [Properties and application behavior of light and dampening material composite gear wheels]" ISBN 978-3-8322-5209-0, WZL, RWTH Aachen, *Berichte aus der Produktionstechnik* Vol. 14/2006, or in the patent DE 955 467 from the year 1957. Oftentimes they involve so-called material composite gear wheels, which consist of several individual joined parts with different materials. These known methods have the drawback that the required force transmission can only be realized under certain conditions. Furthermore, the semifabricated blanks sometimes are very costly to produce and then join together. While the force transmission can be improved in that the individual components are optimized by form fit, this nevertheless increases the production expense. Furthermore, it is known from DE 198 15 860 A1 that a variation of the density in the wheel body of a hollow wheel has positive impact on the noise behavior. Moreover, from EP 1 552 895 B1 there is known a sintered gear wheel in which different densities are arranged along a gear wheel radius for purposes of noise abatement.

The problem which the present invention proposes to solve is to alter a wheel body of a gear wheel in order to reduce the noise level during operation of the gear wheel, especially in a transmission.

This problem is solved with a gear wheel having the features of claim 1 and with a method having the features of claim 18. The formulation of the invention by the independent claims constitutes a first draft, which is not meant to limit the invention, but instead should be understood as only a first formulation attempt. Therefore, one or more features may be replaced by one or more other features or even be eliminated. Advantageous modifications will appear in the following subclaims, from the specification, and also from the figures. One or more features from one or more modifications may also yield new modifications of the disclosure, without any of this being explicitly mentioned.

A gear wheel is proposed having at least one sintered material with a porosity, wherein the gear wheel has, in addition to the porosity, another noise reducing means.

It has been discovered that, by a variation of the density in the wheel body of the gear wheel, the transmission path of the structure-borne sound waves from the generation at the tooth ring to the hub can be interrupted or the sound waves can be broken or reflected so that the structure-borne sound signal at the output, namely, the shaft/bore of the gear wheel, is significantly smaller.

The variations in density may be rotationally symmetrical or local.

It is likewise possible to have a gear wheel in disk arrangement with different densities. The angle of the plane of the individual layers may deviate from the preferred plane, the horizontal plane of the component.

Since the structure-borne sound propagates better in materials with higher density than in materials with less density, it is also possible to introduce sound guide channels in the wheel body or the teeth which specifically deflect or weaken the structure-borne sound waves. The channels and/or local density variations may be filled either with pure material of different density or with combinations of various materials, such as iron powder or even oil.

These sound reduction geometries may be realized with different production methods. This includes, for example, an intelligent filling shoe, especially a rotationally turning filling shoe for filling with at least two different materials, such as is found for example in DE 10 2014 006 374, to which reference is made in full in the context of the disclosure. In this way, for example, density variations can be achieved already during the pressing process, also known as the green to green manufacturing process, as is found in DE 10 2009 042 598, to which reference is made in full in the context of the disclosure, or method (source?), the conventional pressing such as is found in modified form in WO 2013/067995 A1 and to which reference is made in the context of the disclosure, as well as an additive fabrication, for example with a device as is found for example in DE 10 2013 103006 A1. But one may also employ manufacturing methods such as are found basically in EP 2 221 131 A1, EP 1 407 877 A1, EP 1 34527 A2 or also JP S60-162 702 A.

A second possibility of optimizing the transmission path to reduce noise consists in optimizing the topology of the wheel body; for example, using a web shape. Individual braces may be provided with a dampening coating which improves the vibration behavior of the braces. An additive fabrication can likewise be used to realize topology-optimized structures.

A third possibility may involve the incorporation of several closed "spring-mass cells" in the wheel body. A "spring-mass cell" acts as an absorber of a particular frequency band. The "cell" may be filled with various media. By specific design of the "spring-mass system", a kind of "stop band filter" may be incorporated in the wheel body. An additive fabrication can be used for the realization of such structures, for example.

Preferably, it is provided on the gear wheel that an acoustic decoupling of a tooth ring of the gear wheel and a hub is produced, along with a refraction of sound waves by a variation of density in the wheel body, which interrupts a transmission path of the structure-borne sound waves from the generation at the tooth ring to the hub and/or refracts or reflects sound waves so that a structure-borne sound signal at an output in the form of a shaft of the gear wheel or a bore of the gear wheel seems less pronounced.

Furthermore, the possibility exists of having a radial variation of a density in a wheel body of the gear wheel.

Moreover, the possibility exists that a structure-borne sound is refracted, absorbed and/or reflected by chambers which are introduced in a wheel body of the gear wheel. For example, it is provided that the chambers are empty and/or filled with a medium, preferably an oil and/or a loose powder.

Hollow spheres can also be arranged in the powder to be sintered, which can be made of metallic material for example and be sintered along with the powder. For example, one may use a method for this as is known from Waag, U; Schneider, L; Lötmann, P Stephani, G; "Metallic hollow sphere material for the future", Metal Powder, or from Stephani, G; Waag, U; "Superleichte metallische Hohlkugelstrukturen [Superlight metallic hollow sphere structures]", Proceedings of the BMBF-WING Conference 2003, p. 172-181.

Another embodiment calls for the gear wheel having filled/nonfilled chambers for the refraction, absorption and/or reflection of sound waves for noise reduction. Thus, for example, the overall system can be given a low-vibration design by a combination of different densities and/or materials, for example in the radial direction, in the form of disks, without having to sacrifice any load bearing ability. An angle of the plane of the individual layers may deviate from a preferred plane of the gear wheel, which is arranged in particular horizontally.

Another embodiment calls for having an axial density variation. For this, meanders may extend through the gear wheel in the axial direction. Other shapes are also possible.

One preferred embodiment calls for the gear wheel having a disk-like construction of different densities. Thus, disks of higher density may enclose a disk of lesser density. Also, conversely, it is possible for disks of lower density to enclose disks of higher density. The disks may be pressed together or also be individually pressed in advance.

One modification calls for a sound channel to run in the gear wheel as a sound conduit, along which a structure-borne sound is guided. For this, for example, one or more specifically introduced guide channels as sound conduits may hinder a structure-borne sound from getting directly to an output in the form of a shaft or bore of the gear wheel. For example, it is possible for a material with a higher density to form a sound channel and thus enable a sound conduit inside the gear wheel. One embodiment, for example, calls for a sound channel to be filled with a material identical to the surroundings of the sound channel with a lesser porosity. It is also preferable to have a rotationally symmetrical sound conduit, especially about an axis of rotation of the gear wheel. The sound conduit may be interrupted or also continuous.

Another embodiment calls for the gear wheel having a vibration-dampening coating. Furthermore, for example, it is possible for the gear wheel to have a bracing, while the braces of the bracing are preferably coated with a vibration dampener.

Another embodiment calls for one or more asymmetrical geometries being present in the gear wheel, which influence an eigenfrequency of the gear wheel. Besides influencing the rigidity of the gear wheel, the inertia may also be influenced. In this way, for example, one can avoid passing through a speed range which leads to passing through an eigenfrequency and generating resonance effects.

Preferably, however, the noise reduction involves not just the reducing of the structure-borne sounds in and on the gear wheel. Instead, this involves the question of the creation of structure-borne sound by production-related circumstances. It has been discovered that an interaction in the area of production-related parameters with noise reducing means is best suited to providing noise-dampened gear wheels especially for transmissions. Therefore, a gear wheel as proposed preferably above is proposed in which the gear wheel has a quality grade of the designed gear wheel per DIN 3961 and DIN 3962 in terms of at least one parameter, preferably a total profile error $F_a$, a profile angle error $f_{Ha}$ and a profile form error $f_a$, of at least grade 5 or better. This holds especially for spur gear wheels. For bevel gears, ISO 17485 is used for the grade.

According to a further notion of the invention, which may be pursued either dependent or independent upon the previous notion, a method is proposed for the production of a gear wheel having the following steps:

design of a sintered gear wheel using predetermined geometry and loading data, simulation of a load computation and a noise prediction for the designed gear wheel, selection of at least one noise reducing means as described above and below, verification of a load computation and a noise prediction, adapting of the gear wheel if necessary and repeating of at least a verification of the noise prediction or the load computation, drafting of manufacturing data and manufacturing of the gear wheel on the basis of the manufacturing data.

The method preferably calls for simulating several different noise reducing means until a choice of one or more noise reducing means is made with the help of predetermined criteria.

The designing of the gear wheel for example as a first design for a starting point can be done for example through an available database, in which a multiplicity of data, geometry shapes, etc., has been stored. By entering one or more givens, one may then start with a first geometry. A simulation of a load computation can be done for example with traditional programs, which for the most part rely on finite element methods. A noise prediction, in turn, can be made possible by various models which may be used. For example, one may refer to a model representation such as is found in "Simulation und Optimierung des Geräuschverhaltens von Fahrzeuggetrieben [Simulation and optimization of the noise behavior of vehicle transmissions]", Dipl.-Ing. Peter Fietkau, Dipl.-Ing. Axel Baumann, Dipl.-Ing. Sabine Sanzenbacher, Prof. Dr.-Ing. Bernd Bertsche, ATZ—Automobiltechnische Zeitschrift, No. 09/2013, p. 730-735 and to which reference is made in the context of this disclosure. Another very detailed modeling is found in the dissertation of Michael Karl Heider at the Technical University of Munich entitled "Schwingungsverhalten von Zahnradgetrieben—Beurteilung und Optimierung des Schwingungsverhaltens von Stirnrad- und Planetengetrieben [Vibration behavior of gear transmission—evaluation and optimization of the vibration behavior of spur gear and planet gear transmissions]", ISBN 978-3-8439-0767-5.

Different model materials may also be used in the model, especially elastic, viscoelastic, poroelastic models, as well as models for composite materials. In this way, materials with atypical properties may also be used for example in an evaluation and simulation, such as materials with a high dampening behavior and acoustic absorption capability.

Preferably according to one modification it is provided that there is a coupling with an outside room acoustics: the coupling of structures and vibrations is used to analyze in a single coupled vibroacoustic analysis the sound field given off by a vibrating structure of the gear wheel.

Methods based on a frequency response function (FRF) may also be used in the course of the simulation. The makes it possible to determine an energy flow path from a source to a relevant point, in order to identify at an early stage critical pathways and noise sources. For example, a frequency response of the gear wheel is represented by means of unit loads at a given frequency. Different frequency responses may then be combined in order to generate the FRFs of transmissions with this gear wheel.

The method makes it possible to provide one or more different noise reducing means in one or more positions and then to test out the impact on the structure-borne sound behavior of the gear wheel. For this, different local arrangements as well as different dimensions, densities, porosities, geometries or other factors can be simulated. The simulation with the one or more noise reducing enables an estimating of the influence on the load computation and the noise behavior. By assigning various parameters as given, it is possible to evaluate whether the values so discovered satisfy the givens or whether an adapting must be done. By means of iteration methods, this process can run automatically. Finally, manufacturing data such as CAD data can be garnered from the outcome so determined and can go directly into a manufacturing process according to one modification.

Furthermore, it is preferable to adapt a quality grade of the designed gear wheel per DIN 3961 and DIN 3962 in terms of one parameter, preferably a total profile error $F_a$, a profile angle error $f_{Ha}$ and a profile form error $f_a$, each time to the grade 6 or better. One approach to gearing qualities is for example the following:
1) Sinter hard precision machined=>quality comparable to solid steel wheel manufacturing at present, e.g., Q6/Q5 incl. crowns (profile and flank) in the range of 4-15 μm
2) Finish rolled=>profile/flank/pitch=>Q5 after rolling, Q6-7 after hardening (=end condition) or better
3) By using an intelligent wheel body, a broadening of the tolerances (qualities) in individual features may be possible, e.g., Q5-Q6 in profile and pitch and a worse quality in the flank line fHβ of 7-8, in which case the resulting negative influence on the noise is compensated by the dampening wheel body.

It has been discovered in trials that when replacing gear wheels of solid steel with gear wheels made of sintered powder material, there is a shift in the eigenfrequency. This may be accompanied by local increases in the structure-borne sound levels. But since the eigenfrequency of the gear wheel can be influenced for example by the density and thus the altered bending strength, these increases can be effectively counteracted.

If a selective analysis of first to fifth order of the structure-borne sound level as a function of rotary speed is done, it turns out that a lowering of the level can be achieved with the aid of sintered powder metallurgy materials. This can be reinforced by a controlled position of porosities and thus different densities in the gear wheel. By adopting one or more additional proposed noise reducing means, it is possible to achieve a lowering of three dBA or more as compared to the same gear wheel made of solid steel. It is therefore appropriate to use the identical gear wheel of solid steel as a comparison with the PM gear wheel with additional noise abatement means.

Furthermore, the teeth of the gear wheel are taken into account, in that variable tooth stiffness occurs during the engagement in the teeth of the corresponding gear wheel. These changes in stiffness of the teeth as well as tooth deviations may result in different vibrations of the wheel body of the gear wheel as well as those of the gear transmission. Therefore, preferably, not only a static behavior but also preferably a dynamic behavior of the gear wheel is examined, alone or also in its interplay with one or more other gear wheels with which the gear wheel is interteeth. One may provide that additional dynamic forces between the gear wheels are superimposed on static circumferential forces. In an inertial computation of the gear wheel, this is taken into account by the dynamic factor, which corresponds to the ratio of the maximum force acting on a tooth and the tooth force of defect-free teeth under static conditions. The dynamic factor is therefore a measure of the vibration behavior of the gear wheel, as well as the teeth. The vibration behavior is primarily determined by the position of the excitation frequency due to the changing tooth engagement in relation to the eigenfrequency of the rotating vibrating system of the gear wheel. Since there may be an especially critical resonance range about the eigenfrequency and a subcritical range with preresonances below the eigenfrequency as well as a supercritical range with supercritical resonances in the form of upper harmonics above the resonance frequency, this can likewise be taken into account during the design of the gear wheel, the arrangement of the different densities, porosities, and choice of the dampening means. Also in this case the eigenfrequency can be moved upward by increasing the tooth stiffness or downward by lowering the tooth stiffness. Moreover, a computational tool can be used in the design, such as the program of the WZL of the RWTH Aachen, Germany, known under the name ZaKo3D. But in this case a density variation is also involved, for example.

Besides a design of the gear wheel taking into account the dynamic factor, and possibly also its reduction, in another embodiment of the method it can furthermore be provided to also take into account an influence of profile corrections at the tooth tip or at the tooth root. For this, the tip flanks may be partly moved back behind the evolvent for example, in order to partly compensate for the effects of manufacturing deviations and load-related deformations on the vibration and noise behavior of the gear wheel. By a coordinated design taking into account structure-borne soundproofing while at the same time or afterwards taking into consideration design possibilities for influencing the vibration, an overall improved gear wheel of reduced sound level can be found. Preferably, an active influencing of the noise behavior by profile corrections or other design changes goes into the computation and design, for example, along with a density-based stiffness calculation for wheel body and teeth. Furthermore, a noise-dictating excitation behavior of the teeth, even under loading, may also go into the design.

Moreover, a modeling of the perception of the noise is also preferably involved in the analysis. For this, for example, one may include a procedure in the method such as is known from the dissertation of Christian Felix Carl entitled "Gehörbezogene Analyse and Synthese der vibroakustischen Geräuschanregung von Verzahnungen [Auditory analysis and synthesis of vibroacoustic noise excitation of teeth]", ISBN: 978-3-86359-277-6. Here, the perception of transmission noise is traced back to the wheel set design with the aid of psychoacoustic metrics and this is made available through mathematical models. The proposed theoretical model is one approach to portraying a connection between the wheel set-specific excitation and the noise emission produced by vibroacoustic interactions, as well as its psychoacoustic evaluation with the help of a computation process.

Besides the design of the gear wheel, furthermore a method is proposed for the manufacturing of the above gear wheel, wherein a selection of a manufacturing method is made from predetermined manufacturing technology, load analysis, and noise abatement aspects.

One embodiment of a method for production of a sintered gear wheel as described above calls for using at least one of the following manufacturing methods for the forming of a noise reducing means in the gear wheel:

a surface rolling of the teeth of sintered metal to adjust a porosity from noise reduction aspects, a simultaneous arrangement of two or more different powders to be sintered jointly in the same pressing mold for the forming of a noise reducing means in the gear wheel as described above, inserting of one or more bodies in and/or on a material to be sintered of the gear wheel to be produced, preferably a brace, a vibration system, a hollow body or a fluid-filled body, an additive manufacturing process, for example, by means of a laser bed or by means of a binder-additive manufacturing process, a powder sintering process and/or a hybrid method of various manufacturing methods, such as an additive manufacturing method in conjunction with a powder metallurgy sintering method.

The proposed gear wheels may furthermore also be inter-related with other gear wheel designs whose goal is to lessen a clattering or transmission clattering, for example in a transmission. For example, such a gear wheel with a noise reducing means may be a zero-backlash gear wheel. For example, such a gear wheel is found in DE 10 2012 025 210, to which reference is hereby made in full in the scope of this disclosure.

Figure 2:
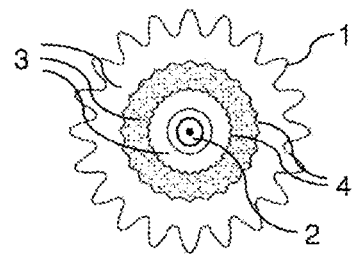
Figure 3:
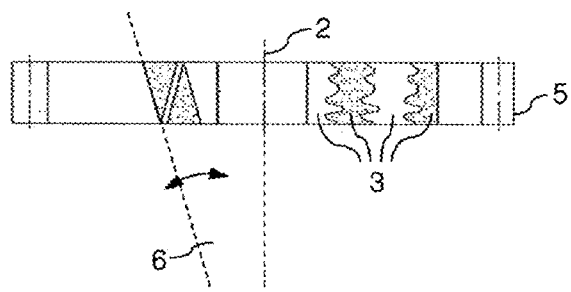
Figure 5:
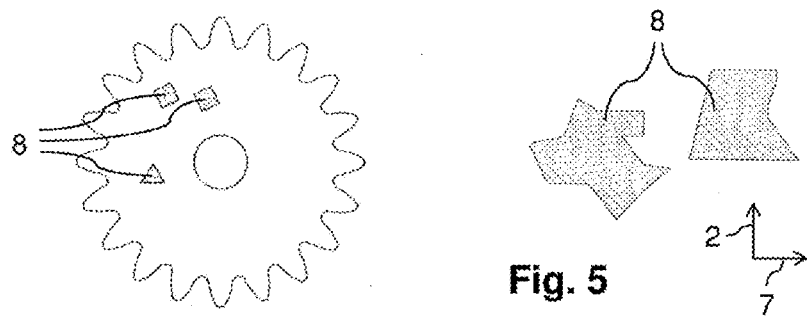
Figure 4:
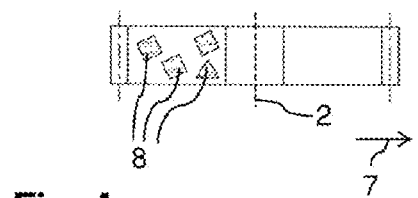
Figure 6:
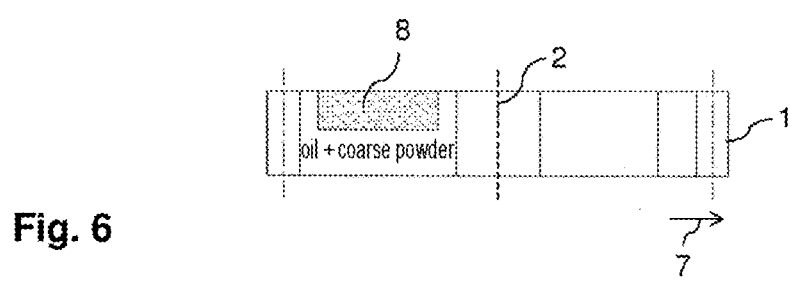
Figure 7:
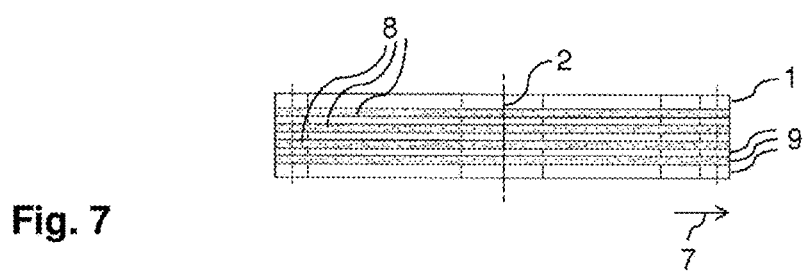
Figure 8:
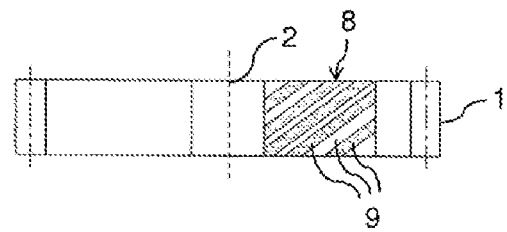
Figures 9, 10:
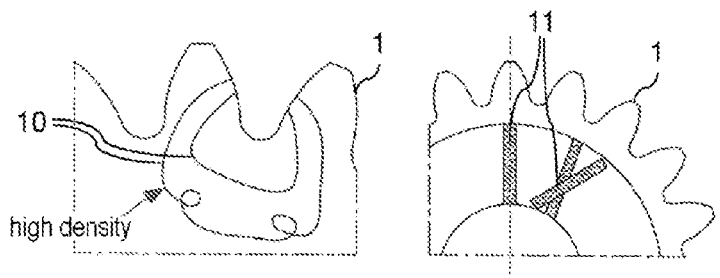
Figure 11:
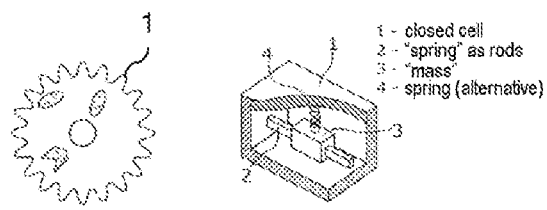
Figure 12:
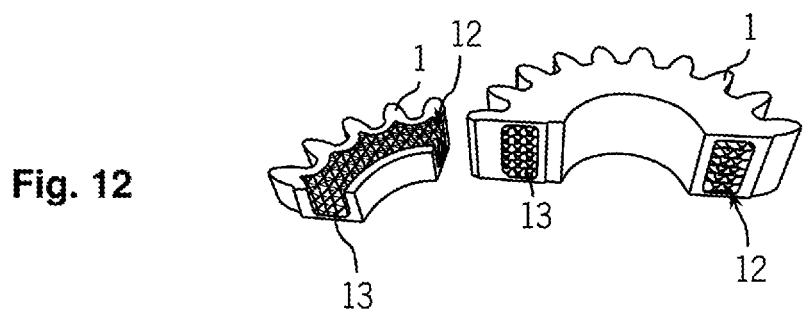

The following figures show various sample embodiments of modified wheel bodies with which a noise reduction is possible. The details presented in the individual figures, however, are not confined to the particular embodiment. Instead, one or more features from one or more figures as well as from the corresponding and/or the above specification can be interrelated to other embodiments in order to realize a solution according to the invention. There are shown:

FIGS. 1 and 2: gear wheels resembling a composite gear wheel, consisting of several individual components produced by powder metallurgy with different densities, FIG. 3: individual components with different densities in the axial direction which can be varied in their shape, FIGS. 4 to 6: local, nonsymmetrically arranged density variations both in the radial and in the axial direction, FIG. 7: a disk-shaped arrangement of elements of different density in the preferred direction, FIG. 8: a disk-shaped arrangement of elements of different densities at an angle to a gear wheel axis, FIG. 9: schematically, sound guiding channels in various configurations, FIG. 10: a topology-optimized rod structure with dampening coated rods, FIG. 11: one possible construction of a "spring-mass cell", and FIG. 12: a gear wheel according to the invention.

FIG. 1 and FIG. 2 show different designs of gear wheels 1 closed density variations 3 arranged around the axis of rotation 2. The respective geometry of the regions of different density may have a fluid transition 4 or also an abrupt density difference. They may pass into one another and have wavy or also jagged configurations.

FIG. 3 shows that the individual parts 5 with different densities 3 may be varied in shape in the axial direction.

Along an axial extension, these density differences may run parallel to the axis of rotation 2 or also make an angle 6 with it.

FIGS. 4 to 6 show local, preferably nonsymmetrically arranged density variations 8 both in the radial 7 and the axial direction 2. Furthermore, on the one hand, the stiffness and thus the eigenfrequency of the gear wheel 1 can be influenced. On the other hand, a structure-borne sound can be absorbed, deflected, or also redirected by this shape.

FIG. 7 shows a disk-shaped construction 9 of the gear wheel 1, each layer having a different density from a neighboring layer 9. This allows, for example, a dampening of the structure-borne sound in the axial direction 2, while the strength of the gear wheel 1 may also still be designed so that high torques can still be transmitted.

FIG. 8 shows an angled arrangement of disks 9 of different density. The gear wheel 1 in particular may also have regions having only density disks running parallel and perpendicular to the axis of rotation 2, as well as regions which are transverse to the axis of rotation.

FIG. 9 shows in a sample view several channels 10 which are arranged to guide the sound in the gear wheel 1. The course of the sound-conducting channels 10 can be made dependent on how the excitation by a gearbox, for example, will then occur. The channels 10 may be entirely filled. But it is likewise possible for the channels to be only incompletely filled with a different material.

FIG. 10 shows a configuration in which the gear wheel 1 has several braces 11. The braces 11 serve for stabilizing and stiffening the gear wheel 1 while at the same time influencing the bending strength. The braces 11 may be fully or partly surrounded by sintered material. One or more segments of a brace may also be at least partly free of sintered material. Furthermore, the possibility exists for a bracing to comprise a jacketing, especially a coating. The coating preferably additionally dampens a structure-borne sound. For this, the coating is preferably open-pore, but it may also be closed-pore.

FIG. 11 shows in only schematically indicated sample form a vibrational system which can be arranged in the gear wheel 1. Preferably a liquid filling is done for this. The vibrational system is preferably designed with knowledge of the later primary speed range of the gear wheel. In this way, on the one hand, it can be active in this region. But according to one modification, it can also be designed on the basis of an eigenfrequency of the gear wheel, for example, in order to counteract an eigenfrequency.

FIG. 12 shows in a sample embodiment a gear wheel with internal predetermined cavities 12, which may be filled for example, or remain clear. For example, such a gear wheel 1 can be made by means of additive powder bed methods. Preferably, a metallic powder is filled into the cavities 12, which is loosely baked together and thereby serves as an adsorber for sound. Preferably, a cavity is filled with a bulk density of 2.5 to 3.5 g/cm$^3$, and this only in part, preferably so that at least 50% of the cavity is filled with air. The loose material can be the same material as the gear wheel 1 or a different material. It should also be considered preferably in the case of honeycomb arrangements 13 that these may have slight deviations from each other. Preferably, the sintering neck is utilized in gear wheels, this one as well as others, for example by supplying of oil or another fluid. Copper can also be added to the sintered gear wheel. Preferably more copper is added to the inside than the outside.

The invention may be used for different gear wheels, especially spur gears, with oblique or straight teeth, and also for bevel gears. Different gear wheels, designed in this way, may find use in the most varied of applications, such as engines of every type, shift-type gearboxes, E-drive systems, household appliances, hand-operated machines, hand-guided machines, and vehicles of every kind.

The invention claimed is:

1. A method for production of a sintered gear wheel comprising the following sequential steps:
   designing the sintered gear wheel using predetermined geometry and loading data,
   simulating a load computation and a noise prediction for the sintered gear wheel as designed,
   selecting at least one noise reducing structure for the sintered gear wheel in which the at least one noise reducing structure is in addition to porosity of the sintered gear wheel and further integrating the at least one noise reducing structure into the sintered gear wheel as designed,
   verifying a load computation and a noise prediction for the sintered gear wheel as designed including the at least one noise reducing structure,
   once or more, optionally adapting of the sintered gear wheel as designed including the at least one noise reducing structure and repeating of at least the verifying of the noise prediction or the load computation,
   drafting of manufacturing data based on the sintered gear wheel as designed including the at least one noise reducing structure and as optionally adapted and verified and manufacturing of the sintered gear wheel on the basis of the manufacturing data.

2. The method as claimed in claim 1, further comprising simulating several different noise reducing structures until a choice of one or more noise reducing structures is made with the aid of predetermined criteria.

3. The method as claimed in claim 1, wherein a quality grade of the designed gear wheel per DIN 3961 and DIN 3962 in terms of at least one parameter selected from a total profile error $F_a$, a profile angle error $f_{Ha}$ and a profile form error $f_a$, is adapted each time to the gearing quality 6 or better.

4. The method as claimed in claim 1, further comprising the step of selecting a manufacturing method from predetermined manufacturing technology, load analysis, and noise abatement aspects.

5. The method as claimed in claim 1, wherein at least one of the following manufacturing methods is used to form the at least one noise reducing structure in the sintered gear wheel:
   a surface rolling and/or surface compacting of teeth of the sintered gear wheel to adjust the porosity from noise reduction aspects,
   a simultaneous arrangement of two or more different powders to be sintered jointly in the same pressing mold for forming of a noise reducing structure in the sintered gear wheel,
   inserting of one or more bodies in and/or on a material to be sintered of the sintered gear wheel to be produced, selected from a brace, a vibration system, a hollow body or a fluid-filled body.

6. The method as claimed in claim 1, wherein an at least partially acoustic decoupling of a tooth ring of the sintered gear wheel and a hub is produced, along with a refraction of sound waves by a variation of density in a wheel body of the sintered gear wheel, which interrupts a transmission path of the structure-borne sound waves from the generation at the tooth ring to the hub and/or refracts, absorbs or reflects sound waves so that a structure-borne sound signal at an output in the form of a shaft of the sintered_gear wheel or a bore of the sintered gear wheel seems less pronounced.

7. The method as claimed in claim 1, wherein there is a radial variation of a density in a wheel body of the sintered gear wheel.

8. The method as claimed in claim 1, wherein a structure-borne sound is refracted, absorbed and/or reflected by chambers which are introduced in a wheel body of the sintered gear wheel.

9. The method as claimed in claim 8, wherein the chambers are empty and/or filled with a medium selected from at least one of an oil and a loose powder.

10. The method as claimed in claim 1, wherein the sintered gear wheel has at least one or more of the following noise reducing structures:
    a refraction, an absorption and/or reflection of sound waves by filled and/or unfilled chambers in the gear wheel,
    a combination of different densities and/or materials which extend in the radial direction to form ring-shaped, rings of different density and/or materials.

11. The method as claimed in claim 1, wherein an axial density variation is provided.

12. The method as claimed in claim 11, wherein the sintered gear wheel has a disk-like construction of different densities.

13. The method as claimed in claim 1, wherein a sound channel runs in the sintered gear wheel along which a structure-borne sound is guided.

14. The method as claimed in claim 13, wherein specifically introduced conduits as noise channels hinder a structure-borne sound from getting directly to an output in the form of a shaft or bore of the sintered gear wheel.

15. The method as claimed in claim 13, wherein a material with a higher density forms the sound channel.

16. The method as claimed in claim 13, wherein the sound channel is provided with a material identical to the surroundings of the sound channel with a lesser porosity.

17. The method as claimed in claim 13, wherein the sound channel has rotational symmetry about an axis of rotation of the gear wheel.

18. The method as claimed in claim 1, wherein the sintered gear wheel has a vibration-dampening coating.

19. The method as claimed in claim 1, wherein the sintered gear wheel has a bracing including braces having a vibration-dampening coating.

20. The method as claimed in claim 1, wherein one or more asymmetrical geometries are present in the sintered gear wheel, which influence an eigenfrequency of the sintered gear wheel.

21. A computer program product for the production of a gear wheel with computer program code on a non-transitory data medium for executing a method as claimed in claim 1.

* * * * *